Oct. 1, 1929.     W. MEIER     1,729,624
SLICING DEVICE
Original Filed Oct. 6, 1927
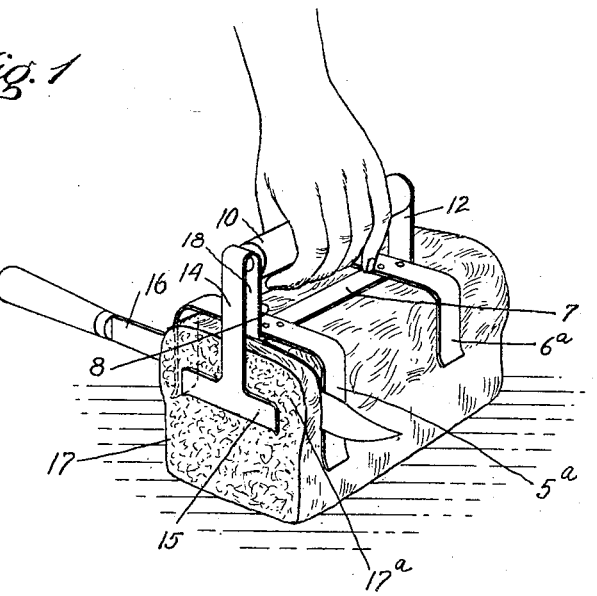
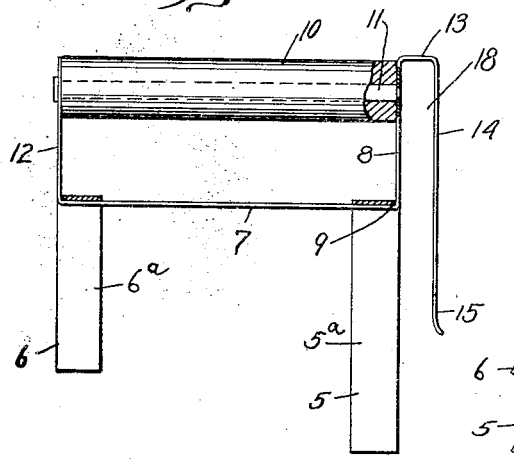
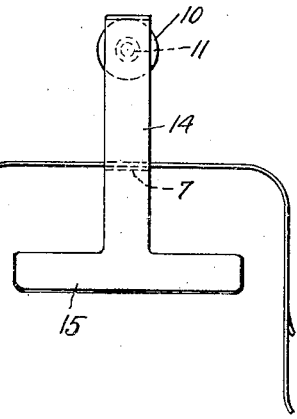
INVENTOR
William Meier
BY
ATTORNEY Patented Oct. 1, 1929

1,729,624

UNITED STATES PATENT OFFICE

WILLIAM MEIER, OF NEWARK, NEW JERSEY

SLICING DEVICE

Application filed October 6, 1927, Serial No. 224,347. Renewed February 18, 1929.

This invention relates to slicing devices for use in slicing bread, cake, meats and other food products; and the object of the invention is to provide a device of the class described in the form of a yoke-shaped body adapted to span and partially encircle the product to be sliced to retain said product in firm position in the operation of slicing and to provide a guide for a knife used in the operation of slicing; a further object being to provide the tool with a handle member arranged above the yoke-shaped body and rearwardly of the knife guiding means thereof, to prevent the cutting of the fingers in the operation of slicing a product; a still further object being to provide a resilient or yieldable gage member arranged forwardly of the knife guiding portion of the tool to gage the thickness of the slices of the food product to be cut; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a perspective view, diagrammatically illustrating the use of my invention in cutting or slicing bread.

Fig. 2 is a side and sectional view of the construction shown in Fig. 1; and,

Fig. 3 is a front view of the device.

In practice, I provide a yoke-shaped frame, consisting in the construction shown, of a front U-shaped member 5, and a rear U-shaped member 6, the side members 6ª of the latter being shorter than the side members 5ª of the former. Said side members are preferably composed of spring material to compensate for slight variations in the particular food product in connection with which the device is used. It will be understood that the yoke-shaped body may be found to suit food products of different cross sectional form and size.

The U-shaped members 5 and 6 are joined by a strap or central body 7, the front end of which is extended and bent at right angles as seen at 8, and passes through a notched portion 9 in the member 5 to bring the outer face of the part 8 in common alinement with the edge face of the member 5 as clearly seen in Fig. 2 of the drawing. The part 8 extends above the yoke-shaped body sufficiently, to provide room for the fingers of a hand encircling a tubular handle member 10 on a pin or rod 11, the front end of which is secured to the part 8, and the rear end of which is secured to a part 12, which constitutes an extension of the rear end of the member 7, which is arranged in substantially parallel relation to the part 8, said parts 8 and 12 forming handle supporting means, as will be apparent.

The upper end of the part 8 extends in an outwardly projecting part 13, and a downwardly directed part 14 arranged in substantially parallel relation to the part 8 and forming a gage member for gaging the thickness of a slice to be cut in a predetermined food product. In the use of my improved device, the gage member 14 extends downwardly below the member 7 and the crosshead of the member 5, and is arranged centrally of said crosshead or intermediate the arms 5ª as clearly seen in Figs. 1 and 3 of the drawing. The lower end of the gage member 14 is flared at opposite sides to form a T crosshead 15 which increases the bearing and cutting surface of said member, and also operates to maintain the inner surface of the crosshead in spaced, parallel relation to the outer edge of the member 5, which guides the knife 16 used in cutting the loaf of bread 17, or other product, as will be apparent.

In the construction shown, the device is constructed primarily for use in the slicing of bread and the U-shaped members 5 and 6 are of such dimensions as to span the upper and side portions of a loaf of bread in the manner illustrated in Fig. 1 of the drawing, the device being held in one hand and pressed firmly upon the top of the loaf with the gage member 14 on one end thereof, after which the blade of the knife 16 is placed in the recess or loop 18 formed between the parts 8, 13 and 14 and is then passed downwardly through the bread with the blade arranged adjacent the outer surfaces or edges of the parts 8, 5, and the thicknesses of the slices of bread 17ª, cut from the loaf 17, will be governed by the spaced relation of the gage member 14 with reference to the members 5 and 8.

It will be noted that the lower ends of the arms 5ª and 6ª are slightly curved in an outward direction and said arms are of such length as to remain short of the full depth of a loaf of bread or other food product being sliced, in order that the food product may be supported under slight pressure to facilitate the slicing thereof. The handle 10 will afford a firm support and engagement of the device in connection with the food product, and will maintain the fingers of the hand rearwardly of the blade of the knife in the operation of slicing. It will also be understood that the device is moved backwardly along the loaf of bread or other food product in the repeated slicing operations, or may be raised and replaced on the food product if desired. It will also be understood that by making the arms 6ª shorter than the arms 5ª, the movement as well as application of the device to the food product is facilitated. It will also be understood that the gage member 14 is flexible, and may be adjusted relatively to the body of the device to vary the thicknesses of the slices to be cut.

It will also be understood that my improved tool is very simple in its construction and can be manufactured and sold at a nominal cost, and is used entirely apart and aside from any table member or support, and in use is supported solely by the food product being sliced upon which the device is mounted.

It will also be understood that while I have shown one specific use for carrying my invention into effect, and have illustrated one method of constructing the device, that my invention is not necessarily limited to the specific structure herein shown and described, nor to the particular contour and arrangement of the parts, and various changes in and modifications of the construction herein set out may be made within the scope of the appended claims, without departing from the spirit of my invention or sacrificing its advantages.

Having fully described my invention, what I claim as new and desire to secure by Letters Patent, is:

1. A device of the class described comprising a yoke-shaped body adapted to be mounted upon and partially encircle a product to be sliced, and means for guiding the blade of a knife over the surface of one end of said body in cutting a slice of said product.

2. A device of the class described comprising a yoke-shaped body adapted to be mounted upon and partially encircle a product to be sliced, means for guiding the blade of a knife over the surface of one end of said body in cutting a slice of said product, and a handle member by means of which said body may be retained in connection with the product in the operation of slicing the same.

3. A device of the class described comprising a yoke-shaped body adapted to be mounted upon and partially encircle a product to be sliced, means for guiding the blade of a knife over the surface of one end of said body in cutting a slice of said product, and a gage member arranged forwardly of and in spaced relation to the guiding means of said body.

4. A device of the class described comprising a yoke-shaped body adapted to be mounted upon and partially encircle a product to be sliced, means for guiding the blade of a knife over the surface of one end of said body in cutting a slice of said product, said body including spaced U-shaped members, and a part bridging said members and coupling the same together.

5. A device of the class described comprising a yoke-shaped body adapted to be mounted upon and partially encircle a product to be sliced, means for guiding the blade of a knife over the surface of one end of said body in cutting a slice of said product, said body including spaced U-shaped members and a part bridging said members and coupling the same together, and a handle member on said body.

6. A device of the class described comprising a yoke-shaped body adapted to be mounted upon and partially encircle a product to be sliced, means for guiding the blade of a knife over the surface of one end of said body in cutting a slice of said product, said body including spaced U-shaped members and a part bridging said members and coupling the same together, a handle member on said body, and a gage member arranged outwardly of one of said U-shaped members, and in spaced relation thereto.

7. A device of the class described comprising a yoke-shaped body adapted to be mounted upon and partially encircle a product to be sliced, means for guiding the blade of a knife over the surface of one end of said body in cutting a slice of said product, said body including spaced U-shaped members and a part bridging said members and coupling the same together, a handle member on said body and a gage member arranged outwardly of one of said U-shaped members and in spaced relation thereto, said gage member having an enlarged end portion.

8. A tool of the class described comprising spaced U-shaped members, a handle member coupling the crosshead of said members, and a gage member arranged outwardly of and in spaced relation to one of said U-shaped members, said gage member including an upwardly extending loop portion arranged above the crosshead of the adjacent U-shaped member.

9. A tool of the class described comprising spaced U-shaped members, a handle member coupling the crosshead of said members, a gage member arranged outwardly of and in spaced relation to one of said U-shaped members, said gage member including an upwardly extending loop portion arranged above the crosshead of the adjacent U-shaped member, and the side arms of said U-shaped members having resilient properties to compensate for products of different sizes.

10. A tool of the class described comprising two bands of metal fashioned into U-shaped cross sectional form, a strip of metal secured to the central crosshead portions of said members and coupling the same together in spaced relation, the ends of said strip extending upwardly from said crossheads, and a handle member mounted in connection with the ends of said strip.

11. A tool of the class described comprising two bands of metal fashioned into U-shaped cross sectional form, a strip of metal secured to the central crosshead portions of said members and coupling the same together in spaced relation, the ends of said strip extending upwardly from said crossheads, a handle member mounted in connection with the ends of said strip, and one end of said strip extending downwardly beyond the crosshead of one of said U-shaped members and in spaced relation thereto to form a gage member.

12. A tool of the class described comprising two bands of metal fashioned into U-shaped cross sectional form, a strip of metal secured to the central crosshead portions of said members and coupling the same together in spaced relation, the ends of said strip extending upwardly from said crossheads, a handle member mounted in connection with the ends of said strip, one end of said strip extending downwardly beyond the crosshead of one of said U-shaped members and in spaced relation thereto to form a gage member, and the lower end of said gage member being enlarged.

13. A slicing device of the class described comprising a saddle-shaped body adapted to be mounted upon the product to be sliced, a handle member for applying and removing said body with reference to the product to be sliced, one end of said body serving to guide a knife blade in its movement through the product, and a gage member arranged forwardly of said end of the body and regulating the thickness of the slice to be cut.

In testimony that I claim the foregoing as my invention I have signed my name this 1st day of October, 1927.

WILLIAM MEIER.